G. H. HUME.
Detaching-Apparatus for Check-Reins.
No. 197,635. Patented Nov. 27, 1877.
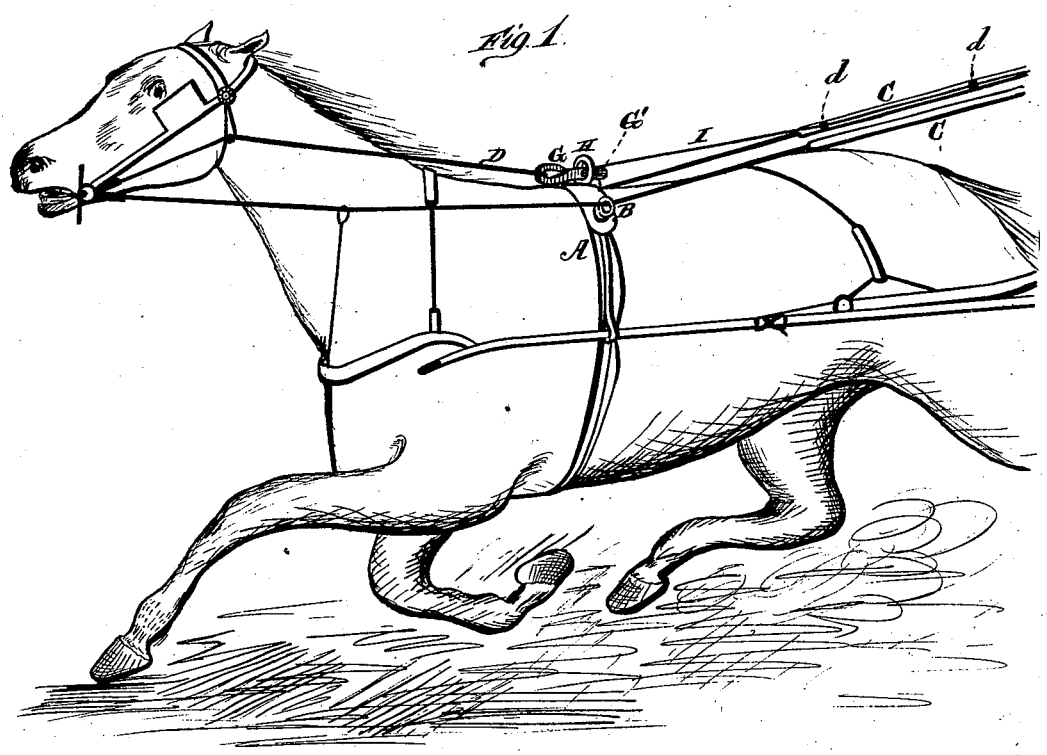
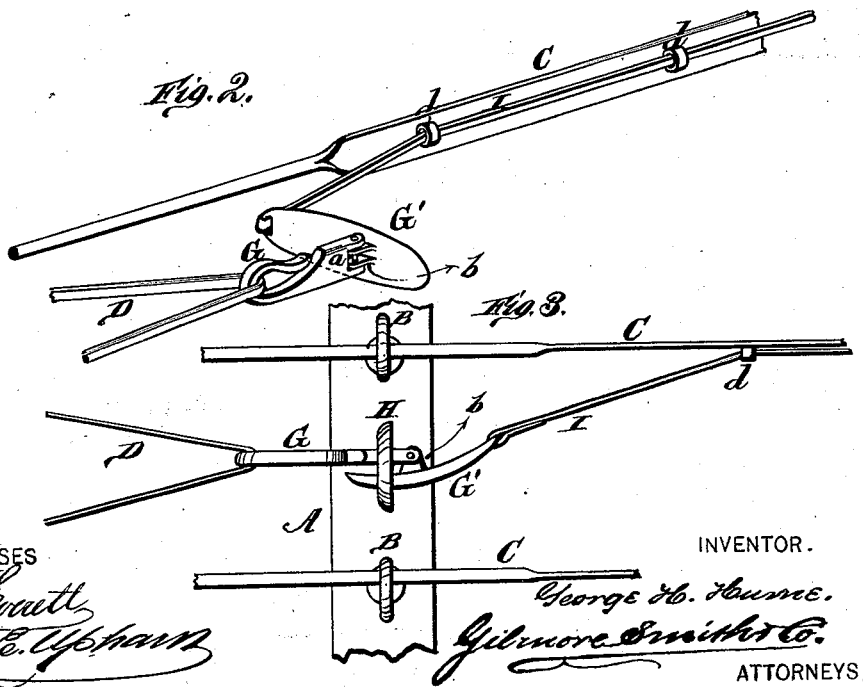

UNITED STATES PATENT OFFICE.

GEORGE H. HUME, OF PAOLA, KANSAS.

IMPROVEMENT IN DETACHING APPARATUS FOR CHECK-REINS.

Specification forming part of Letters Patent No. 197,635, dated November 27, 1877; application filed October 20, 1877.

*To all whom it may concern:*

Be it known that I, GEORGE H. HUME, of Paola, in the county of Miami and State of Kansas, have invented a new and valuable Improvement in Check-Rein Detachers; and I do hereby declare that in the following is a full, clear, and exact description of the construction and operation of the same, reference being had to the annexed drawings, making a part of this specification, and to the letters and figures of reference marked thereon.

Figure 1 of the drawings is a representation of a harness with my check-rein detacher as applied. Fig. 2 is a perspective view, and Fig. 3 a plan view, thereof.

This invention relates to that class of check-hooks which are attached to the saddle of the harness and provided with a line running back to the vehicle, so that the driver can detach and fasten the check-rein without leaving his seat; and the novelty consists in a hook having a pivoted bar, used in connection with the check-rein and a connecting-line.

It also consists in the combination of the parts, as will be hereinafter more fully set forth.

The annexed drawings, to which reference is made, fully illustrate my invention.

A represents the saddle of a harness, with terrets B, through which the driving lines C pass. D is the ordinary check-rein, which is attached to the check-hook G. This hook is made entirely separate from the harness-saddle, and the rear end of the hook is forked, as shown at *a*. G' represents a bar of suitable dimensions, of somewhat oval form, one side being convex, and the other side flat.

From the flat side of the bar G' to one side of the center projects one or two lugs, *b*, which are inserted in the fork *a* of the hook G, and there pivoted by a pin or rivet, as shown, in such manner that it can be turned to one side and lie flat against the side of the hook.

On top of the harness-saddle A is secured a ring, H, as shown. To fasten the check-hook G to the saddle, the bar G' is turned on a line with the hook G, and then passed from the front through the ring H, until the bar G' can be turned on its pivot at right angles with the hook, and form a stop against the ring.

To the long end of the bar G' is attached a cord, strap, or line, I, which is run back to the vehicle. This strap or line may run through loops *d*, attached to one of the driving-lines C, or be held to any other suitable part of the harness.

When it is desired to release the check-rein, the driving-lines C are first pulled to raise the horse's head and slacken the check-rein; the line I is then pulled, which straightens the bar G', so that it can pass forward through the ring H. In like manner the check-rein is fastened again when desired. The driver can thus attach and detach the check-rein at any time without getting off his seat.

What I claim as new, and desire to secure by Letters Patent, is—

1. The hook G, provided with the pivoted bar G', in combination with the check-rein D, ring H, and line I, substantially as and for the purposes set forth.

2. The check-rein D, attached to hook G, and provided with pivoted bar G', and line I, secured to rein C by means of loops *d d*, in combination with terret B, substantially as described, and for the purpose set forth.

In testimony that I claim the above I have hereunto subscribed my name in the presence of two witnesses.

GEORGE H. HUME.

Witnesses:
S. D. CONDON,
JOSEPH E. MAXWELL.